(12) United States Patent
Sato

(10) Patent No.: US 7,805,241 B2
(45) Date of Patent: Sep. 28, 2010

(54) ROUTE SETTING DEVICE AND ROUTE SETTING METHOD

(75) Inventor: Shinpei Sato, Sagamihara (JP)

(73) Assignee: Nissan Motor Co., Ltd., Yokohama (JP)

(*) Notice: Subject to any disclaimer, the term of this patent is extended or adjusted under 35 U.S.C. 154(b) by 975 days.

(21) Appl. No.: 11/604,249

(22) Filed: Nov. 27, 2006

(65) Prior Publication Data

US 2007/0143011 A1    Jun. 21, 2007

(30) Foreign Application Priority Data

Dec. 20, 2005  (JP)  ............................. 2005-366327
Sep. 4, 2006   (JP)  ............................. 2006-238970

(51) Int. Cl.
*G01C 21/32* (2006.01)

(52) U.S. Cl. .................. 701/208; 701/209; 340/990; 340/991; 340/992; 340/993; 340/994

(58) Field of Classification Search ................ 701/208, 701/209; 340/990–995
See application file for complete search history.

(56) References Cited

U.S. PATENT DOCUMENTS

| | | | |
|---|---|---|---|
| 5,911,773 A * | 6/1999 | Mutsuga et al. ............. 701/200 |
| 5,931,888 A * | 8/1999 | Hiyokawa .................... 701/208 |
| 5,941,930 A * | 8/1999 | Morimoto et al. ........... 701/201 |
| 6,041,281 A * | 3/2000 | Nimura et al. .............. 701/211 |
| 6,061,628 A * | 5/2000 | Hayashi et al. ............. 701/208 |
| 6,067,500 A * | 5/2000 | Morimoto et al. ........... 701/209 |
| 6,115,669 A * | 9/2000 | Watanabe et al. ........... 701/209 |
| 6,405,130 B1 * | 6/2002 | Piwowarski .................. 701/210 |
| 6,484,092 B2 * | 11/2002 | Seibel ........................ 701/209 |
| 6,560,533 B2 * | 5/2003 | Sugawara et al. ........... 701/211 |
| 6,597,986 B2 * | 7/2003 | Mikame ...................... 701/211 |
| 6,859,724 B2 * | 2/2005 | Komatsu ..................... 701/202 |
| 6,911,918 B2 * | 6/2005 | Chen ........................ 340/995.13 |
| 6,941,221 B2 * | 9/2005 | Draeger et al. ............. 701/208 |
| 7,062,379 B2 * | 6/2006 | Videtich ..................... 701/210 |
| 7,092,818 B2 * | 8/2006 | Ohler ......................... 701/209 |
| 7,174,253 B2 * | 2/2007 | Videtich ..................... 701/210 |
| 7,239,962 B2 * | 7/2007 | Plutowski ................... 701/209 |
| 2007/0143011 A1 * | 6/2007 | Sato .......................... 701/208 |

FOREIGN PATENT DOCUMENTS

| | | |
|---|---|---|
| DE | 10009727 | 9/2001 |
| EP | 0827126 | 3/1998 |
| JP | 2000-193478 | 7/2000 |
| JP | 2002-062153 | 2/2002 |
| JP | 2004-093240 | 3/2004 |

* cited by examiner

*Primary Examiner*—Thomas G Black
*Assistant Examiner*—Wae Louie
(74) *Attorney, Agent, or Firm*—Global IP Counselors, LLP

(57) ABSTRACT

A route setting device includes a current location detecting section, a transit point setting section, a recommended route calculating section and a transit point determining section. The transit point determining section is configured to determine whether the user selected transit point is a disposable type of transit point and whether the transit point set is a substitutable type of transit point based on the user setting instruction. The recommended route calculating section is configured to calculate a non transit point recommended route without requiring the user selected transit point to be along the non transit point recommended route when the user selected transit point is the disposable type, and an alternative transit point recommended route with the alternative transit point located along the alternative transit point recommended route when the user selected transit point is the substitutable type.

21 Claims, 5 Drawing Sheets

ROUTE SETTING DEVICE AND ROUTE SETTING METHOD

CROSS-REFERENCE TO RELATED APPLICATIONS

This application claims priority to Japanese Patent Application Nos. 2005-366327, filed on Dec. 20, 2005 and 2006-238970, filed on Sep. 4, 2006. The entire disclosures of Japanese Patent Application No. 2005-366327 and 2006-238970 are hereby incorporated herein by reference.

BACKGROUND OF THE INVENTION

1. Field of the Invention

The present invention relates to a route setting device and a route setting method configured to set a route from a starting point to a destination via a transit point.

2. Background Information

Japanese Laid-Open Patent Application Publication No. 2004-93240 discloses a conventional navigation device that determines whether a point set to be a transit point or a destination may be substituted by another point after a recommended route to the destination has been calculated. If the transit point or the destination is determined to be substitutable, then at least one of the transit point and the destination is substituted for the alternative point, and an alternative route that passes the alternative point is searched.

In view of the above, it will be apparent to those skilled in the art from this disclosure that there exists a need for an improved route setting device and an improved route setting method. This invention addresses this need in the art as well as other needs, which will become apparent to those skilled in the art from this disclosure.

SUMMARY OF THE INVENTION

When the conventional navigation device, as described in the above mentioned reference, determines to present the alternate route to the user, the conventional navigation device inevitably calculates the alternate route that passes through the transit point previously set by a user or an alternative transit point even if the user does not wishes to pass through the transit point or the alternative transit point.

Accordingly, one object of the present invention is to provide a route setting device and a route setting method that can improve the level of convenience for a user by better accommodating an intention of the user in calculating an alternate route.

In order to achieve the above mentioned object, a route setting device includes a current location detecting section, a transit point setting section, a recommended route calculating section and a transit point determining section. The current location detecting section is configured to detect a current vehicle location of a host vehicle. The transit point setting section is configured to set a user selected transit point based on a user setting instruction from a user. The recommended route calculating section is configured to calculate a first recommended route from the current vehicle location to a destination via the user selected transit point. The transit point determining section is configured to determine whether the user selected transit point set by the transit point setting section is a disposable type of transit point in which a subsequently recommended route is not required to pass through the user selected transit point based on the user setting instruction, and to determine whether the transit point set by the transit point setting section is a substitutable type of transit point in which an alternative transit point can be substituted for the user selected transit point based on the user setting instruction. The recommended route calculating section is further configured to calculate a non transit point recommended route from the current vehicle location to the destination without requiring the user selected transit point to be along the non transit point recommended route when the user selected transit point is determined to be the disposable type by the transit point determining section, and to calculate an alternative transit point recommended route from the current vehicle location to the destination with the alternative transit point located along the alternative transit point recommended route when the user selected transit point is determined to be the substitutable type by the transit point determining section.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
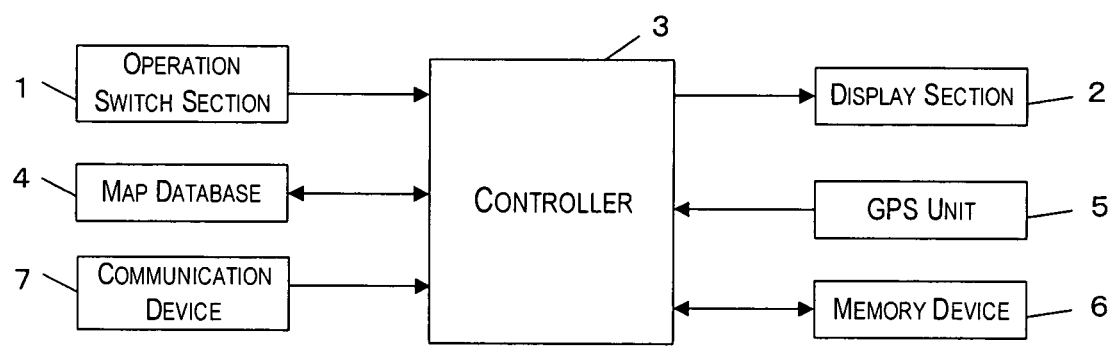
FIG. 1 is a schematic block diagram of a route setting device in accordance with a first embodiment of the present invention.

Referring initially to FIG. 1, a route setting device is illustrated in accordance with a first embodiment of the present invention. FIG. 1 is a schematic block diagram of the route setting device in accordance with the first embodiment. The route setting device of the present invention is adapted to be used in, for example, a vehicle navigation device. As shown in FIG. 1, the route setting device basically includes an operation switch section 1, a display section 2, a controller 3, a map database 4, a GPS unit 5, a memory device 6, and a communication device 7.

The operation switch section 1 is a human-machine interface with which a user inputs a variety of information to the vehicle navigation device. For example, the user can specify a destination and a transit point along the route to the destination where the user would like to stop by operating the operation switch section 1. The user can also input conditions for setting the destination and/or the transit point by operating the operation switch section 1. The display section 2 is configured and arranged to display a map of an area around a current location of the vehicle, a recommended route calculated by the controller 3, as described below, and the like.

The controller 3 preferably includes a microcomputer with a route setting control program that controls the vehicle navigation device as discussed below. The controller 3 can also include other conventional components such as an input interface circuit, an output interface circuit, and storage devices such as a ROM (Read Only Memory) device and a RAM (Random Access Memory) device. The microcomputer of the controller 3 is programmed to control the display section 2. The memory circuit stores processing results and control programs such as ones for the route setting control operation that are run by the processor circuit. The controller 3 is operatively coupled to the operation switch section 1, the display section 2, the map database 4, the GPS unit 5, the memory device 6 and the communication device 7 in a conventional manner. The internal RAM of the controller 3 stores statuses of operational flags and various control data. The controller 3 is capable of selectively controlling any of the components of the control system of the vehicle navigation device in accordance with the control program. It will be apparent to those skilled in the art from this disclosure that the precise structure and algorithms for the controller 3 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The map database 4 is, for example, a hard disk drive (HDD) that is configured and arranged to store map data. Examples of map data stored in the map database 4 include route calculation data used for calculating the recommended route; names of intersections, names of roads, and other route guidance data used for guiding the vehicle to the destination in accordance with the recommended route; road data indicating the form of the roads; background data indicating shorelines, rivers, railroads, buildings, and other map features other than roads; and POI (point of interest) data. The POI data includes names, locations, types, telephone numbers, and other data for various facilities.

The GPS unit 5 is configured and arranged to receive a GPS signal from a GPS (global positioning system) satellite, and to detect the current position of the vehicle. The memory device 6 is configured and arranged to store data relating to the recommended route that is set by the controller 3. The communication device 7 is configured and arranged to receive traffic congestion information, highway regulation information, and other road traffic information from an electromagnetic wave beacon, light beacon, or other device placed on roadsides.

The controller 3 is configured to calculate a recommended route from the current position of the vehicle (starting point) detected by the GPS unit 5 to the destination via the transit point set by the user. In addition, if a rerouting calculation (route recalculation) is needed, then the controller 3 is configured to discard the transit point previously set by the driver as necessary, to reset an alternative transit point as necessary, and to recalculate the recommended route as described in more detail below.

Figure 2:
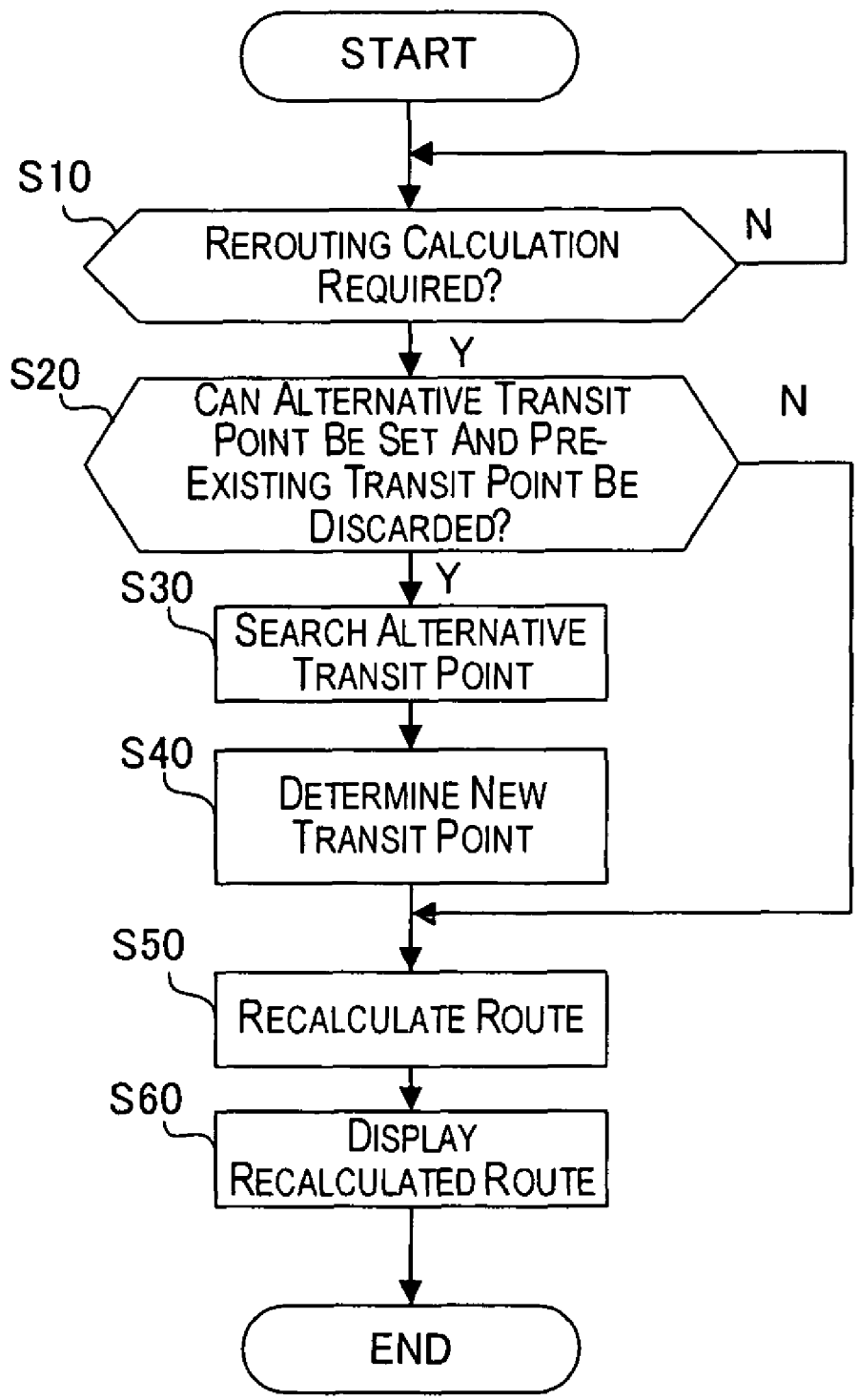
FIG. 2 is a flowchart illustrating a route setting control executed by the route setting device in accordance with the first embodiment of the present invention.

FIG. 2 is a flowchart illustrating a route setting control process executed by the route setting device of the first embodiment. When the power of the navigation device is turned on and the user inputs a command to calculate a recommended route to a destination via a transit point by operating the operation switch section 1, the controller 3 is configured to calculate a recommended route leading to the destination via the transit point as instructed by the user. The process for calculating the recommended route leading to the destination via the transit point is a conventional process that is well known in the art. Since such process is well known in the art, the precise steps included in the recommended route calculation process will not be discussed or illustrated in detail herein. Rather, it will be apparent to those skilled in the art from this disclosure that the process for calculating the recommended route leading to the destination via the transit point can be any type of programming that can be used to carry out the present invention. Once the controller 3 calculates the recommended route from the current position of the vehicle to the destination via the transit point, the controller 3 starts the process involved in step S10 of FIG. 2.

In step S10, the controller 3 is configured to determine whether a rerouting calculation for recalculating the route to the destination is necessary (i.e., to determine whether a rerouting calculation condition is satisfied). For example, a rerouting calculation is determined to be necessary if the vehicle deviates from the recommended route and begins to travel on another route in order to, for example, avoid a congested area or a traffic accident. A rerouting calculation is also determined to be necessary when the user presses a reroute button (not shown) included in the operation switch section 1. When a rerouting calculation is determined to be unnecessary in step S10 (No in step S10), the controller 3 is configured to repeat step S10. When a rerouting calculation is determined to be necessary in step S10, the controller 3 is configured to proceed to step S20.

In step S20, the controller 3 is configured to determine whether an alternative transit point can be set in the rerouting calculation. In other words, in step S20, the controller 3 is configured to determine whether the transit point previously set by the driver is substitutable with another transit point. The transit point set by the driver before the rerouting calculation (shown in FIG. 2) is referred hereinafter as a pre-existing transit point. An alternative transit point is a transit point that is different from the pre-existing transit point.

More specifically, the controller 3 is configured to determine in step S20 that the alternative transit point can be set if the user previously set the pre-existing transit point by using a searching condition with which the transit point is not limited to a specific facility. An example of the searching condition with which the transit point is not limited to a specific facility is, for example, a condition specifying a "category" of a facility that indicates a type of transit point, and the search is conducted based on the condition specifying the category. For example, a "gasoline station," "family restaurant," "convenience store," or other category of facility may be specified by the user, and a search may be conducted to set the pre-existing transit point. In such case, the controller 3 is configured to determine that the alternative transit point can be set in step S20. Moreover, even when the name of the facility is specified, if the facility specified by the user is a franchise, chain, or other system for which a plurality of stores exist, such search is considered as a search conducted based on the searching condition with which the transit point is not limited to a specific facility (the search designating the "category" of the facility) because of the large number of the same type of stores.

Furthermore, facilities at which the same objective can be achieved can also be included in the same category. For example, when a user specifies "bank" as the transit point in order to withdraw money, money can also be withdrawn at a convenience store in which an ATM is installed. In such instances, the controller 3 is configured to determine that a convenience store having an ATM can be set as an alternative transit point of the pre-existing transit point (bank) because the same objective of withdrawing money can be achieved at the convenience store. When the controller 3 determines that an alternative transit point can be set in step S20, the controller 3 is configured to proceed to step S30.

On the other hand, when the search for the pre-existing transit point was conducted using a searching condition that limits the transit point to a specific facility, the controller 3 is configured to determine that an alternative transit point cannot be set in step S20. Examples of the searching condition that limits the transit point to a specific facility include a condition whereby a search is made using the Japanese character input system or alphabetical character input system to indicate the name of a specific facility of which only one exists, and a condition with which a search for the transit point is conducted by inputting the address, phone number, or other information relating to a specific facility in a limited manner. A searching condition for identifying a specific store of a facility that is a franchise or chain system (e.g., when a search is made by indicating the Yokohama Station branch of a chain of convenience stores called XX Stores) is regarded as a searching condition limited to a specific facility even if a plurality of franchise or chain stores exist. Also, the controller 3 is configured to determine that an alternative transit point cannot be set in step S20 when no other facilities of the same category exist in the area within which the search for the recommended route to the destination is conducted even if a category-specific search was conducted to set the pre-existing transit point. If the controller 3 determines in step S20 that an alternative transit point cannot be set, then the controller 3 is configured to proceed to step S50.

In step S30, the controller 3 is configured to conduct a search for the alternative transit point. The search for the alternative transit point is conducted using the same searching condition as the condition used to search for the pre-existing transit point. For example, when the pre-existing transit point was set and a search was conducted based on the user inputting "family restaurant" as the category of the transit point, the controller 3 is configured to search for a family restaurant disposed between the current location of the vehicle detected by the GPS unit 5 and the destination. When the pre-existing transit point was set by inputting "family restaurant" as the category of the transit point and the time of arrival at the transit point was specified by the driver as 12 o'clock, the controller 3 is also configured to conduct a search for a family restaurant where the vehicle can arrive at about 12 o'clock as the alternative transit point. The search for the alternative transit point in step S30 is accordingly conducted using the same search condition as the condition used to search for the pre-existing transit point, and the search for the alternative transit point can thereby be conducted according to the intentions of the user.

When several alternative transit point candidates are found as a result of the process for searching for an alternative transit point in step S30, the controller 3 is configured to display the search results on the display section 2 so that the user can select a desired alternative transit point. The user selects the desired alternative transit point from among the alternative transit point candidates displayed on the display section 2 by operating the operation switch section 1. When the alternative transit point has been selected by the user or automatically by the controller 3, then the controller 3 is configured to proceed to step S40.

In step S40, the controller 3 is configured to compare a first route leading to the destination via the pre-existing transit point from the current vehicle location (the starting point) with an alternative transit point recommended route leading to the destination via the alternative transit point selected in step S30 from the current vehicle location (the starting point). Then, the controller 3 is configured to select one of the pre-existing transit point and the alternative transit point that requires the shorter amount of time to arrive at the destination as a new transit point. The amount of time required to arrive at the destination can be calculated using a conventional method that is well known in the art. When the controller 3 selects the new (alternative) transit point in step S40, the controller 3 is configured to proceed to step S50.

In step S50, the controller 3 is configured to calculate a recommended route to the destination via the new transit point selected in step S40 using the current location of the vehicle detected by the GPS unit 5 as the starting point, and the controller 3 is configured to proceed to step S60. If the controller 3 determines that an alternative transit point cannot be set in step S20 (No in step S20), then the controller 3 is configured to calculate the recommended route to the destination via the pre-existing transit point in step S50.

In step S60, the controller 3 is configured to display the recommended route calculated in step S50 on the display section 2.

Figure 3:
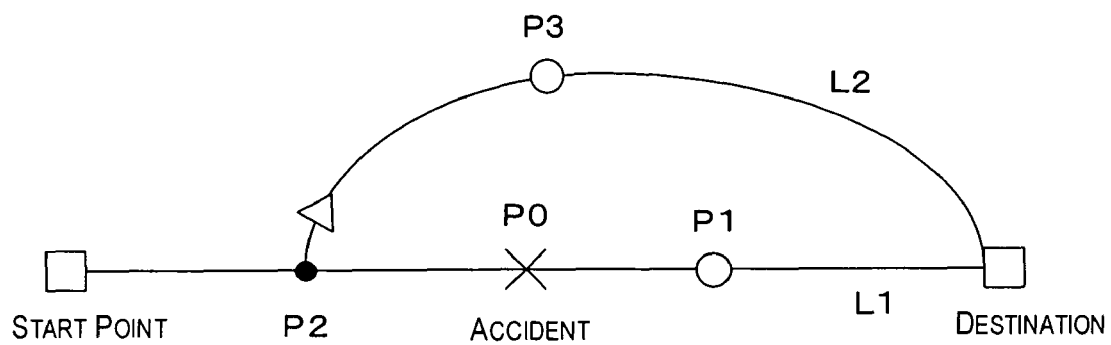
FIG. 3 is a schematic diagram illustrating an example of a recommended route that leads to a destination via an alternative transit point with a current location of the vehicle being set as a starting point in accordance with the first embodiment of the present invention.

FIG. 3 is a schematic diagram illustrating an example of the recommended route leading to the destination via the new (alternative) transit point set in step S40 using the current location of the vehicle as the starting point. The recommended route initially calculated is set to a route L1 to the destination via the transit point P1 (pre-existing transit point). When the driver knows that an accident has occurred at point P0 on the route L1 and turns onto a road that is not on the route L1 at point P2 in order to avoid the scene of the accident, a rerouting calculation is started (Yes in step S10). As described above, the controller 3 is configured to conduct a search for an alternative transit point P3 using the same searching condition as the condition used to search for the pre-existing transit point P1 (steps S30 and S40). Then, the controller 3 is configured to calculate a recommended route P2 that passes through the transit point P3 (step S50).

According to the route setting device of the first embodiment, when the previously calculated recommended route needs to be recalculated, the controller 3 is configured to determine whether the pre-existing transit point can be discarded or not (i.e., whether the pre-existing transit point is of substitutable type that can be substituted with an alternative transit point or not). When the controller 3 determines that the pre-existing transit point can be discarded, the controller 3 is configured to set the alternative transit point based the same condition used to set the pre-existing transit point, and to calculate a route leading to the destination via the alternative transit point using the current location of the vehicle as the starting point. Therefore, a route that is not limited by the pre-existing transit point can be provided to the user. Accordingly, when the recalculating of the route is required and when it would take longer to arrive at the destination if a route is taken which leads to the destination via the pre-existing transit point, the route setting device of the first embodiment can set an optimal transit point as the alternative transit point, thereby shortening the amount of time required to arrive at the destination.

Moreover, according to the route setting device of the first embodiment, the controller 3 is configured to conduct a search for the alternative transit point based on the same condition as the condition used when the search for the pre-existing transit point was conducted. Therefore, the new transit point can be set according to the intentions of the user.

Furthermore, according to the route setting device of the first embodiment, when a plurality alternative transit point candidates exist, the controller 3 is configured to set the transit point selected by the user from among the alternative transit point candidates as the alternative transit point. Therefore, the new transit point can be set according to the intentions of the user.

Second Embodiment

Figure 4:
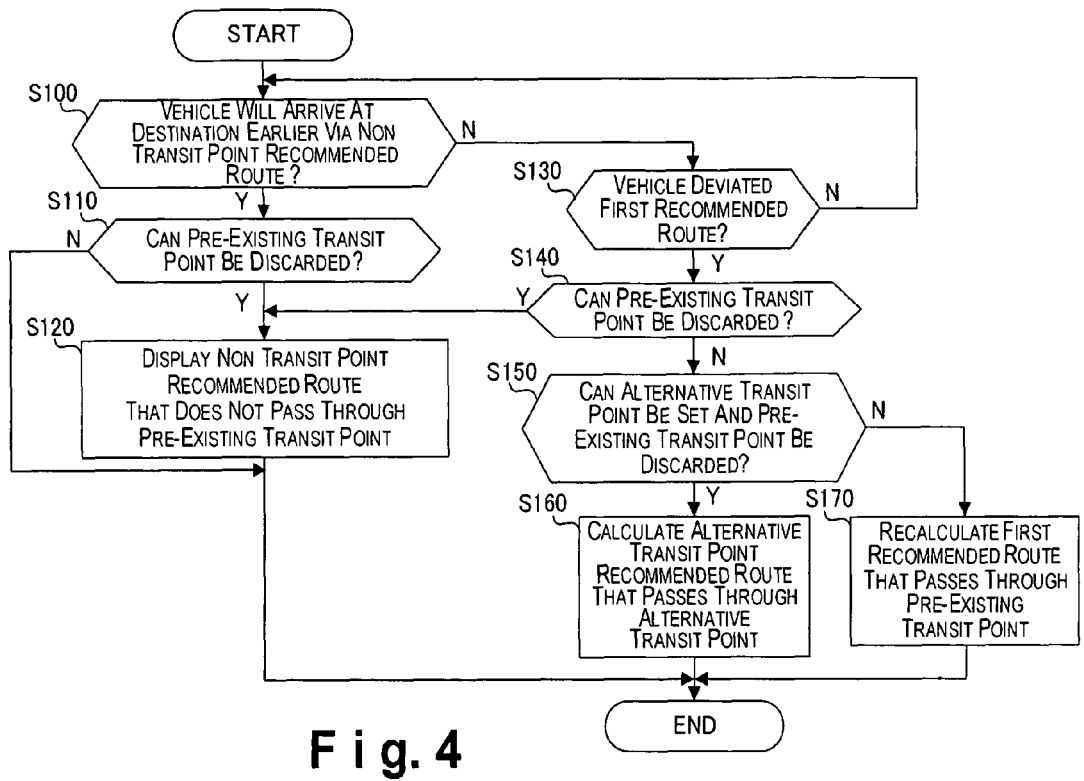
FIG. 4 is a flowchart illustrating a route setting control executed by a route setting device in accordance with a second embodiment of the present invention.
Figure 5:
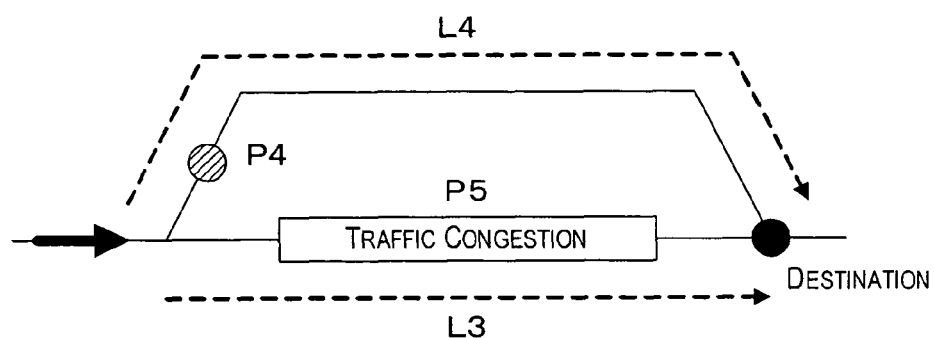
FIG. 5 is a schematic diagram illustrating an example of the route setting control when a transit point is set by directly specifying a specific transit point from a map in accordance with the second embodiment of the present invention.
Figure 6:
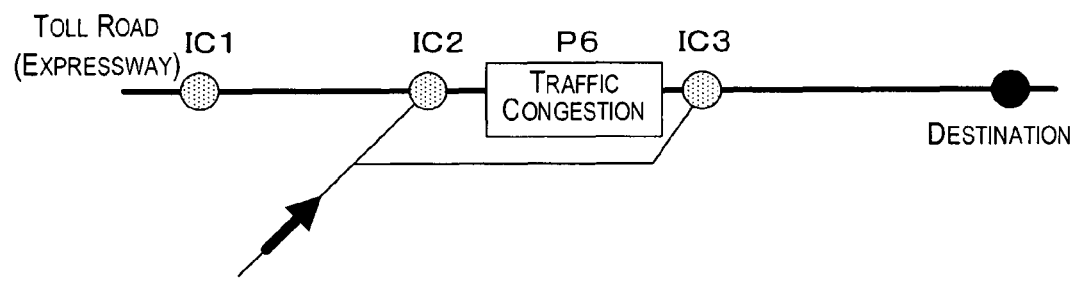
FIG. 6 is a schematic diagram illustrating an example of the route setting control when a user has set an expressway interchange as a transit point in accordance with the second embodiment of the present invention.

Referring now to FIGS. 4 to 6, a route setting device and a route setting method in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The configuration of the route setting device of the second embodiment is the same as that of the route setting device of the first embodiment as shown in FIG. 1, except that the control process executed by the controller 3 is different in the second embodiment. More specifically, in the first embodiment, the controller 3 is configured to recalculate a recommended route, and to set a new transit point by discarding the pre-existing transit point when the initially calculated recommended route is required to be recalculated. On the other hand, the route setting device of the second embodiment is configured to repeatedly calculate a recommended route that does not pass through the pre-existing transit point while the vehicle is traveling. If the controller 3 determines that the vehicle can reach the destination earlier via the recommended route that does not pass through the pre-existing transit point than when traveling via the initially calculated recommended route that passes through the pre-existing transit point, then the controller 3 is configured to determine whether the pre-existing transit point can be discarded. If the controller 3 determines that the pre-existing transit point can be discarded, then the controller 3 is configured to present the recommended route that does not pass through the pre-existing transit point to the user.

FIG. 4 is a flowchart showing the details of a control process executed by the route setting device of the second embodiment. When the power of the navigation device is turned on and the user inputs a command to calculate a recommended route to a destination via a transit point by operating the operation switch section 1, the controller 3 is configured to calculate a recommended route leading to the destination via the transit point as instructed by the user. Also, the controller 3 is configured to repeatedly calculate the recommended route to the destination that does not pass through the pre-existing transit point specified by the user while the vehicle is traveling. The initially calculated recommended route that leads to the destination via the transit point specified by the user is herein referred to as a first recommended route, while the recommended route to the destination that does not pass through the transit point specified by the user is herein referred to as a non transit point recommended route. The first recommended route is calculated only once at the beginning of the control process. The non transit point recommended route is repeatedly calculated while the vehicle is traveling with consideration given to road traffic information or other relevant information received by the communication device 7.

After calculating the first recommended route, the controller 3 is configured to start the process involved in step S100 of FIG. 4. In step S100, the controller 3 is configured to determine whether the destination can be reached earlier via the non transit point recommended route than via the first recommended route with respect to the current location of the vehicle. More specifically, the controller 3 is configured to use a conventional method to calculate a first predicted arrival time for arriving at the destination via the first recommended route, and a second predicted arrival time for arriving at the destination via the non transit point recommended route, and to compare the first and second predicted arrival times to determine which of the first and non transit point recommended routes will result in an earlier arrival at the destination. If the controller 3 determines that the vehicle will arrive at the destination earlier when the vehicle travels on the non transit point recommended route than when the vehicle travels on the first recommended route (Yes in step S100), then the controller 3 is configured to proceed to step S110.

In step S110, the controller 3 is configured to determine whether the pre-existing transit point can be discarded (i.e., whether the pre-existing transit point is a disposable type of transit point) based on the setting condition or searching condition used when the user set the pre-existing transit point. More specifically, the controller 3 is configured to determine that the pre-existing transit point can be discarded if the pre-existing transit point was previously set according to at least one prescribed method. For example, the controller 3 can be programmed to include the three following prescribed methods (setting conditions) in which a pre-existing transit point can be discarded: (1) The pre-existing transit point was set by the user by directly specifying (entering) a point to be set as a transit point from a map displayed on the display section 2; (2) The pre-existing transit point was set by specifying a name of an intersection; and (3) The pre-existing transit point is set by specifying a toll road interchange (IC).

For example, a user who is familiar with a location where traffic congestion often occurs may set a transit point by directly specifying a specific point from a map in order to avoid the location where the traffic congestion occurs. FIG. 5 is a diagram used to describe this process. When the user sets a transit point P4 in order to avoid an area P5 where the traffic congestion often occurs, a route L4 that passes through the transit point P4 is initially calculated as a recommended route (first recommended route). The user does not need to specify a precise point as the transit point P4 because the transit point P4 is set in order to avoid the location P5 where the traffic congestion often occurs. In other words, the user may specify an approximate location on the map as the transit point P4.

However, when there is actually no traffic congestion in the area P5, the destination can be reached earlier with a route L3 (non transit point recommended route) that does not pass through the transit point P4 that is specified by the user than with the recommended route L4 that passes through the transit point P4. Therefore, passing through the transit point P4 is not necessarily desirable because the user has set the transit point P4 in order to avoid the area P5 where the traffic congestion often occurs. In other words, discarding the transit point P4 will not present any particular problem, and presenting the user with the route L3 that does not pass through the transit point P4 as the recommended route will be more beneficial to the user. Accordingly, when the user directly specifies (enters) a point on the map displayed on the display section 2 to be set as the transit point, the controller 3 is configured to determine that the pre-existing transit point (the transit point P4) can be discarded in step S110.

The controller 3 is also configured to determine that the pre-existing transit point can be discarded when the pre-existing transit point was set by specifying the name of an intersection similarly to when the pre-existing transit point was specified from a map displayed on the display section 2 as described above.

FIG. 6 is a schematic diagram illustrating an example in which the user set a toll road (e.g., an expressway) interchange as the transit point. If an expressway is used to reach a destination, concerns related to tolls may cause the user to wish to enter the expressway from an interchange IC2 that is in the direction of the destination rather than an interchange IC1 that is closest to the current location of the vehicle but that is in the direction opposite the destination as shown in FIG. 6. In such case, the user may set the interchange IC2 as the transit point.

However, when the traffic in an area P6 between the interchange IC2 and the interchange IC3 is congested, entering the expressway from an interchange IC3 may result in an earlier arrival at the destination. Since the user previously set the interchange IC2 as the transit point in order to avoid entering the expressway from the interchange IC1, the user does not necessarily want to enter the expressway from the interchange IC2. In other words, no particular problem is presented even if the interchange IC2 is discarded as the transit point, and setting the interchange IC3 as the transit point is more advantageous to the user. Accordingly, the controller 3 is configured to determine that the pre-existing transit point can be discarded when the pre-existing transit point was set by specifying a toll road interchange in step S110.

On the other hand, when the method used by the user to set the transit point does not correspond to the aforementioned method (1), (2) or (3) in step S110, the controller 3 is configured to determine that the pre-existing transit point cannot be discarded. In such case, the initially calculated first recommended route that passes through the pre-existing transit point is retained. In other words, the first recommended route displayed on the display section 2 is retained. On the other hand, if the controller 3 determines that the pre-existing transit point can be discarded because the pre-existing transit point was set by using the aforementioned method (1), (2) or (3), the controller 3 is configured to proceed to step S120.

In step S120, the controller 3 is configured to display the non transit point recommended route that does not pass through the pre-existing transit point on the display section 2. The controller 3 can also be configured to simultaneously alert the user that the pre-existing transit-point has been discarded via the display section 2 in step S120.

On the other hand, if the controller 3 determines in step S100 that traveling along the initially set first recommended route will result in an arrival at the destination earlier than by traveling along the non transit point recommended route (No in step S100), then the controller 3 is configured to proceed to step S130. In step S130, the controller 3 is configured to determine whether the vehicle has deviated from the first recommended route based on the current location of the vehicle detected by the GPS unit 5. If the controller 3 determines that the vehicle is traveling on the first recommended route in step S130 (No in step S130), then the controller 3 is configured to return to step S100. On the other hand, if the controller 3 is configured to determine that the vehicle has deviated from the first recommended route in step S130 (Yes in step S130), then the controller 3 is configured to proceed to step S140.

In step S140, the controller 3 is configured to determine whether the pre-existing transit point can be discarded. The control process in step S140 is the same as the control process in step S110. If the controller 3 determines that the pre-existing transit point can be discarded in step S140, then the controller 3 is configured to proceed to step S120. On the other hand, if the controller 3 determines that the pre-existing transit point cannot be discarded, then the controller 3 is configured to proceed to step S150.

In step S150, the controller 3 is configured to determine whether an alternative transit point, which is an alternative to the pre-existing transit point, can be set (i.e., whether the pre-existing transit point is substitutable). The control process performed in step S150 is the same as the control process performed in step S20 of the flowchart shown in FIG. 2 in the first embodiment, and thus, a detailed description of the control process in step S150 is omitted. If the controller 3 determines that an alternative transit point can be set in step S150 (Yes in step S150), then the controller 3 is configured to proceed to step S160. On the other hand, if the controller 3 determines that an alternative transit point cannot be set in step S150, then the controller 3 is configured to proceed to step S170.

In step S160, the controller 3 is configured to conduct a search for an alternative transit point and to recalculate an alternative transit point recommended route to the destination via the alternative transit point (rerouting calculation). Then, the controller 3 is configured to display the calculated alternative transit point recommended route on the display section 2. The control process performed in step S160 is the same as the control process performed in steps S30 to S60 of the flowchart shown in FIG. 2 in the first embodiment. Thus, the recommended route that is not limited by the pre-existing transit point on the first recommended route can be presented to the user by performing a rerouting calculation based on the alternative transit point.

On the other hand, in step S170, the controller 3 is configured to recalculate the first recommended route to the destination via the pre-existing transit point, i.e., the transit point specified by the user, (rerouting calculation), and to display the calculated first recommended route on the display section 2. The control process performed in step S170 is the same as the control process performed in steps S50 and S60 of the flowchart shown in FIG. 2 when the controller 3 determines that the alternative transit point cannot be set in step S20 in the first embodiment.

Alternatively, the control process executed in steps S100 and S110 of FIG. 4 may be omitted in order to further simplify the control process of the second embodiment of the present invention. In such case, after the vehicle navigation device is turned on and the first recommended route that passes through the user selected transit point is calculated, the controller 3 starts the control process involved in step S130 to determine whether the vehicle has deviated the first recommended route. If the vehicle has not deviated the first recommended route in step S130, the controller 3 is configured to repeat step S130 until it is detected that the vehicle has deviated the first recommended route. In such case, since steps S100 in which the controller 3 repeatedly calculates the arrival time of the vehicle at the destination via the first recommended route and via the non transit point recommended route can be eliminated, the control process executed in the route setting device can be simplified.

According to the route setting device of the second embodiment, the controller 3 is configured to initially calculate the first recommended route to the destination via the transit point set based on the instruction from the user. Also, the controller 3 is configured to repeatedly calculate, while the vehicle is traveling, the non transit point recommended route from the current location of the vehicle to the destination that does not pass through the pre-existing transit point. When the controller 3 determines that traveling along the non transit point recommended route will result in an earlier arrival at the destination than traveling along the first recommended route and that the pre-existing transit point can be discarded based on the method used for setting the pre-existing transit point, the non transit point recommended route is displayed on the display section 2. Therefore, a recommended route that is not limited by the pre-existing transit point can be presented to the user. Since the controller 3 is configured to determine whether the pre-existing transit point may be discarded based on the method used for searching for the transit point, whether the pre-existing transit point can be discarded or not can adequately be determined.

Moreover, according to the route setting device of the second embodiment, the controller 3 is configured to determine that the pre-existing transit point can be discarded when the user sets the pre-existing transit point by specifying one of a point on a map, an interchange of an expressway, and the name of an intersection. Therefore, whether the pre-existing transit point can be discarded can be adequately determined, and a recommended route that is not limited by the pre-existing transit point can be presented to the user.

In addition, according to the route setting device of the second embodiment, the non transit point recommended route is presented to the user if the controller 3 determines that that the vehicle has deviated from the first recommended route and that the pre-existing transit point can be discarded. Therefore, a recommended route that is not limited by the pre-existing transit point on the first recommended route can be presented to the user when the vehicle deviates from the first recommended route.

Furthermore, according to the route setting device of the second embodiment, if the controller 3 determines that the vehicle has deviated from the first recommended route and that the pre-existing transit point cannot be discarded, then the controller 3 is configured to calculate the alternative transit point recommended route to the destination via an alternative transit point, which is an alternative to the pre-existing transit point, and to present the third recommended route to the user. The alternative transit point recommended route that passes through the alternative transit point, which is an alternative to the pre-existing transit point, can thereby be presented to the user even if the pre-existing transit point cannot be discarded.

According to the route setting device of the second embodiment, the controller 3 is configured to conduct a search for an alternative transit point in the same manner as in the route setting device of the first embodiment in which a facility that belongs to the same category as the facility set as the pre-existing transit point is set as the alternative transit point. The controller 3 can also be configured to conduct a search for a facility as the alternative transit point that can achieve the same objective as the facility set as the pre-existing transit point. Therefore, the controller 3 can conduct a search for a suitable facility as the alternative transit point based on the intentions of the user.

The present invention is not limited to the above-described first and second embodiments. For example, in step S20 of the flowchart shown in FIG. 2 in the first embodiment and in step S150 of the flowchart shown in FIG. 4 in the second embodiment, the controller 3 determines that the alternative transit point can be set when the user previously set the pre-existing transit point by using a searching method for searching for a transit point by "category," and that the alternative transit point cannot be set if the user previously set the pre-existing transit point by using a searching method limited to a specific facility rather than a method using a "category". However, whether or not an alternative transit point can be set may be determined by using other methods. For example, the controller 3 may be configured to determine that an alternative transit point cannot be set if only one transit point (search result) was found when the search was conducted for the pre-existing transit point, and to determine that an alternative transit point can be set if a plurality of transit points (search result) were found when the search was conducted for the pre-existing transit point.

Alternatively, the route setting device of the present invention can be configured such that whether an alternative transit point can be set can also be selected by the user in advance. For example, a button or the like may be provided to the vehicle navigation device by which the user selects either "allow alternative transit point setting" or "prevent alternative transit point setting" to select whether an alternative transit point can be set or not. Thus, in such case, the controller 3 is configured to determine that an alternative transit point can be set if "allow alternative transit point setting" is selected, and to determine that an alternative transit point cannot be set if "prevent alternative transit point setting" is selected.

Furthermore, the route setting device of the present invention can be configured such that whether an alternative transit point can be set is confirmed with the user. For example, the route setting device can be configured such that the text "can an alternative transit point be set?" is displayed on the display section 2. When the user responds in the affirmative by operating the operation switch section 1, the controller 3 is configured to determine that an alternative transit point can be set. On the other hand, if the user responds in the negative by operating the operation switch section 1, the controller 3 is configured to determine that an alternative transit point cannot be set. The method for confirming with the user whether an alternative transit point can be set is not limited to a method using the display section 2, and confirmation with the user can also be performed using, for example, audio output from a speaker (not shown).

Moreover, the route setting device of the present invention may be configured such that the result of setting the pre-existing transit point is used when conducting the search for the alternative transit point. For example, when the user performed a search using the keyword "bank" and then selected "XX bank" from among a plurality of banks that are found when the pre-existing transit point was set, then the search for "XX bank" may be performed as a priority when a search is conducted for an alternative transit point.

In step S40 of the flowchart shown in FIG. 2 in the first embodiment and in step S160 of the flowchart shown in FIG. 4 in the second embodiment, the controller 30 is configured to compare the recommended route to the destination via the pre-existing transit point and the recommended route to the destination via the alternative transit point, and to select the recommended route requiring the shortest amount of time to arrive at the destination. Alternatively, the controller 3 may be configured to select the recommended route that has the shortest traveling distance to the destination. Moreover, the controller 3 may be configured to select the recommended route based on the distance or the travel time to the transit point (e.g., distance to or arrival time at the transit point desired by the user) rather than the distance or the travel time to the destination. Furthermore, the route setting device may be configured such that the recommended route to the destination via the pre-existing transit point and the recommended route to the destination via the alternative transit point are displayed on the display section 2, and the user is allowed to select a desired route.

In the illustrated embodiments, a situation in which the vehicle deviates from the recommended route and begins to travel on another route, and a situation in which the user presses the reroute button (not shown), were given as examples of situations in which a rerouting calculation for the recommended route is needed. However, situations in which a rerouting calculation is required to be performed are not limited to such examples. For example, the controller 3 may be configured to determine that a rerouting calculation is needed when traffic congestion or a traffic accident occurs along the recommended route or there is a change in the traffic conditions that affect the traveling condition of the vehicle. In such case, the changes in traffic conditions can be detected based on road traffic information received by the communication device 7.

In the second embodiment, the controller 3 is configured to repeatedly calculate the non transit point recommended route that does not pass through the pre-existing transit point while the vehicle is traveling. In addition, the controller 3 may be configured to repeatedly recalculate the recommended route to the destination via the pre-existing transit point. For example, when there has been a change in the road conditions, the recommended route determined by the rerouting calculation may be different from the first recommended route that is initially calculated. In such case, the controller 3 may be configured to select the recommended route that results in the earliest arrival time at the destination by periodically comparing the three recommended routes that include the first recommended route that passes through the pre-existing transit point, the non transit point recommended route that does not pass through the pre-existing transit point, and the recommended route that passes through the pre-existing transit point and is determined by the rerouting calculation. In this method as well, the controller 3 is configured to proceed to step S110 of the flowchart shown in FIG. 4 if the controller 3 determines in step S100 that traveling along the non transit point recommended route will result in an earlier arrival at the destination than traveling along either of the two other recommended routes. The controller 3 is configured to otherwise proceed to step S130.

The route setting device of the present invention can be configured such that the user is allowed to select in advance whether the pre-existing transit point can be discarded. For example, a button or the like may be provided to the vehicle navigation device by which the user selects either "the pre-existing transit point can be discarded" or "the pre-existing transit point cannot be discarded" to select whether the pre-existing transit point can be discarded or not. Thus, in such case, the controller 3 is configured to determine that the pre-existing transit point can be discarded if "the pre-existing transit point can be discarded" is selected, and to determine that the pre-existing transit point cannot be discarded if cannot be set if "the pre-existing transit point cannot be discarded" is selected.

Furthermore, the route setting device of the present invention can be configured such that whether the pre-existing transit point can be discarded is confirmed with the user. For example, the route setting device can be configured such that the text "can the pre-existing transit point be discarded?" is displayed on the display section 2. When user responds in the affirmative by operating the operation switch section 1, the controller 3 is configured to determine that the pre-existing transit point can be discarded. The controller 3 is configured to determine that the pre-existing transit point cannot be discarded if the user responds in the negative. Alternatively, the route setting device can be configured such that the text "can the pre-existing transit point be discarded?" is displayed on the display section 2 after the controller 3 determines that the transit point can be discarded based on the searching method used for setting the pre-existing transit point in order to further confirm with the user that the pre-existing transit point can be discarded. In such case, when the user responds in the affirmative, the controller 3 is configured to discard the pre-existing transit point. The method for confirming with the user whether the pre-existing transit point can be discarded is not limited to a method that uses the display section 2, and can also be a method in which confirmation with the user is performed using, for example, audio output from a speaker (not shown).

In the illustrated embodiments, the communication device 7 is configured and arranged to receive congestion information, road regulation information, and other road traffic information from an electromagnetic wave beacon or a light beacon placed on roadsides. However, the road traffic information can also be received by using vehicle-to-vehicle communication or other conventional methods.

In the illustrated embodiments, the map database 4 is explained as, for example, an HDD. However, the map data recorded on a CD-ROM, DVD-ROM, or other recording medium can also be retrieved for use in the route setting device of the present invention.

The controller 3 preferably constitutes a transit point setting section, a recommended route calculating section (e.g., steps S30-50 of FIG. 2, steps S120, 150-170 of FIG. 4), a transit point determining section (e.g., steps S110, S140 and S150 of FIG. 4), a disposability determining section (e.g., steps S110 and S140 of FIG. 4), a substitutability determining section (e.g., step S20 of FIG. 2 and step S150 of FIG. 4). The GPS unit 5 preferably constitutes a current vehicle location detecting section. The display section 2 preferably constitutes a presenting section. The above description is merely an example, and the interpretation of the invention concerning the corresponding relationship between the constituent elements of the claims and the constituent elements of the above embodiments are not limited to the above example.

Accordingly, with the route setting device and route setting method of the present invention, when the controller 3 determines that the transit point specified by the user can be discarded when the recommended route is recalculated, then a recommended route not limited by the transit point specified by the user can be presented to the user. When the controller 3 determines that the transit point cannot be discarded, a recommended route that passes through an alternative transit point can be presented to the user. Thus, a higher level of convenience for the user can be obtained with the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A route setting device comprising:
   a current location detecting section configured to detect a current vehicle location of a host vehicle;
   a transit point setting section configured to set a user selected transit point based on a user setting instruction from a user;
   a recommended route calculating section configured to calculate a first recommended route from the current vehicle location to a destination via the user selected transit point; and
   a transit point determining section configured to determine, based on the user setting instruction, whether the user selected transit point set by the transit point setting section is a disposable type of transit point through which a subsequently recommended route, that is calculated after the first recommended route, is not required to pass, and to determine, based on the user setting instruction, whether the transit point set by the transit point setting section is a substitutable type of transit point in for which an alternative transit point can be substituted so that the subsequently recommended route can pass through the alternative transit point,
   the recommended route calculating section being further configured to calculate as the subsequently recommended route a non transit point recommended route from the current vehicle location to the destination without requiring the user selected transit point to be located along the non transit point recommended route when the user selected transit point is determined to be the disposable type by the transit point determining section, and being further configured to calculate as the subsequently recommended route an alternative transit point recommended route from the current vehicle location to the destination with the alternative transit point being located along the alternative transit point recommended route when the user selected transit point is determined to be the substitutable type by the transit point determining section.

2. The route setting device according to claim 1, wherein the transit point determining section includes a disposability determining section that is configured to determine whether the user selected transit point is the disposable type based on a setting condition used as part of the user setting instruction to set the user selected transit point by the transit point setting section, and a substitutability determining section that is configured to determine whether the user selected transit point is the substitutable type based on a searching condition used as part of the user setting instruction to set the user selected transit point by the transit point setting section.

3. The route setting device according to claim 2, wherein the substitutability determining section is configured to determine that the user selected transit point is the substitutable type when the searching condition used to set the user selected transit point is directed to a category of facility, and
   the recommended route calculating section is further configured to set a facility that falls within the same category as a facility set as the user selected transit point by the transit point setting section as the alternative transit point to calculate the alternative transit point recommended route.

4. The route setting device according to claim 2, wherein the substitutability determining section is configured to determine that the user selected transit point is the substitutable type when the searching condition used to set the user selected transit point is directed to a category of facility at which the same objective can be achieved, and
   the recommended route calculating section is further configured to set a facility at which the same objective can be achieved as at a facility set as the user selected transit point by the transit point setting section as the alternative transit point to calculate the alternative transit point recommended route.

5. The route setting device according to claim 2, wherein the substitutability determining section is further configured to determine that the user selected transit point is not the substitutable type when the user specified in advance that the user selected transit point cannot be changed.

6. The route setting device according to claim 2, wherein the substitutability determining section is further configured to determine that the user selected transit point is not the substitutable type when the user selected transit point set by the transit point setting section is a specific facility.

7. The route setting device according to claim 6, wherein the substitutability determining section is further configured to determine that the user selected transit point is the specific facility when the user specifies at least one of an address and a telephone number of the specific facility as the user selected transit point.

8. The route setting device according to claim 2, wherein the disposability determining section is configured to determine that the user selected transit point set by the transit point setting section is the disposable type when the user selected transit point was set by specifying a toll road interchange as the user selected transit point.

9. The route setting device according to claim 2, wherein the disposability determining section is configured to determine that the user selected transit point set by the transit point setting section is the disposable type when the user selected transit point was set by specifying a name of an intersection as the user selected transit point.

10. The route setting device according to claim 2, further comprising
a selecting section configured to receive a user selection of whether the user selected transit point set by the transit point setting section can be discarded,
the disposability determining section being configured to determine whether the user selected transit point set by the transit point setting section is the disposable type based on the user selection received by the selecting section.

11. The route setting device according to claim 2, wherein the disposability determining section being configured to determine that the user selected transit point set by the transit point setting section is the disposable type when the user confirms that the user selected transit point set by the transit point setting section can be discarded.

12. The route setting device according to claim 1, wherein the transit point determining section is further configured to determine whether the user selected transit point is the disposable type of transit point and whether the user selected transit point is the substitutable type of transit point upon a reroute calculation condition being satisfied.

13. The route setting device according to claim 12, further comprising
a deviation determining section configured to determine whether the host vehicle has deviated from the first recommended route based on the current vehicle location,
the transit point determining section being further configured to determine the rerouting calculation condition is satisfied when the deviation determining section detects that the host vehicle has deviated from the first recommended route.

14. The route setting device according to claim 1, wherein the recommended route calculating section is configured to recalculate the first recommended route that passes through the user selected transit point set by the transit point setting section when the transit point determining section determines that the user selected transit point is neither the disposable type nor the substitutable type.

15. The route setting device according to claim 1, wherein the transit point determining section is further configured to determine whether the user selected transit point is the disposable type upon detecting that the host vehicle is estimated to arrive at the destination earlier when the host vehicle travels on the non transit point recommended route than when the host vehicle travels on the first recommended route.

16. A route setting device comprising:
a current location detecting section configured to detect a current vehicle location of a host vehicle;
a transit point setting section configured to set a user selected transit point based on a user setting instruction from a user;
a recommended route calculating section configured to calculate a first recommended route from the current vehicle location to a destination with the first recommended route including the user selected transit point, and configured to calculate, while the host vehicle is traveling, a non transit point recommended route from the current vehicle location to the destination without requiring the user selected transit point to be located along the non transit point recommended route;
an arrival time determining section configured to determine which one of the first recommended route and the non transit point recommended route will result in an earlier arrival at the destination;
a disposability determining section configured to determine whether the user selected transit point is a disposable type, through which the non transit point recommended route is not required to pass, based on a setting condition that is used as part of the user setting instruction by the transit point setting section to set the user selected transit point; and
a presenting section configured to present the non transit point recommended route to the user when the disposability determining section determines that the user selected transit point is the disposable type and when the arrival time determining section determines that the non transit point recommended route will result in an arrival at the destination earlier than the first recommended route.

17. The route setting device according to claim 16, further comprising
a deviation determining section configured to determine whether the host vehicle has deviated from the first recommended route based on the current vehicle location detected by the current location detecting section,
the presenting section being configured to present the non transit point recommended route to the user when the deviation determining section determines that the host vehicle has deviated from the first recommended route and the disposability determining section determines that the user selected transit point is the disposable type.

18. The route setting device according to claim 16, further comprising
an alternative transit point searching section configured to search for an alternative transit point that substitutes the user selected transit point set by the transit point setting section,
the recommended route calculating section being further configured to calculate an alternative transit point recommended route from the current vehicle location to the destination with an alternative transit point located along the alternative transit point recommended route when the deviation determining section determines that the host vehicle has deviated from the first recommended route and the disposability determining section determines that the user selected transit point is not the disposable type, and
the presenting section being configured to present the alternative transit point recommended route calculated by the recommended route calculating section to the user.

19. A route setting device comprising:
current location detecting means for detecting a current vehicle location of a host vehicle;
transit point setting means for setting a user selected transit point based on a user setting instruction from a user;
recommended route calculating means for calculating a first recommended route from the current vehicle location to a destination via the user selected transit point;

transit point determining means for determining, based on the user setting instruction, whether the user selected transit point is a disposable type of transit point through which a subsequently recommended route, that is calculated after the first recommended route, is not required to pass, and to determine, based on the user setting instruction, whether the user selected transit point is a substitutable type of transit point for which an alternative transit point can be substituted so that the subsequently recommended route can pass through the alternative transit point, the recommended route calculating means further includes a function for calculating, as the subsequently recommended route, a non transit point recommended route from the current vehicle location to the destination without requiring the user selected transit point to be located along the non transit point recommended route when the user selected transit point is determined to be the disposable type, and the recommended route calculating means further includes a function for calculating, as the subsequently recommended route, an alternative transit point recommended route from the current vehicle location to the destination with the alternative transit point being located along the alternative transit point recommended route when the user selected transit point is determined to be the substitutable type.

20. A route setting device comprising:

current location detecting means for detecting a current vehicle location of a host vehicle;

transit point setting means for setting a user selected transit point based on a user setting instruction from a user;

recommended route calculating means for calculating a first recommended route from the current vehicle location to a destination with the first recommended route including the user selected transit point, and for calculating, while the host vehicle is traveling, a non transit point recommended route from the current vehicle location to the destination without requiring the user selected transit point to be located along the non transit point recommended route;

arrival time determining means for determining which one of the first recommended route and the non transit point recommended route will result in an earlier arrival at the destination;

disposability determining means for determining whether the user selected transit point is a disposable type, through which the non transit point recommended route is not required to pass, based on a setting condition that is used as part of the user setting instruction by the transit point setting means to set the user selected transit point; and presenting means for presenting the non transit point recommended route to the user when the disposability determining means determines that the user selected transit point is the disposable type and when the arrival time determining means determines that the non transit point recommended route will result in an arrival at the destination earlier than the first recommended route.

21. A route setting method comprising:

detecting a current vehicle location of a host vehicle;

setting a user selected transit point based on a user setting instruction from a user;

calculating a first recommended route from the current vehicle location to a destination with the first recommended route including the user selected transit point, and calculating, while the host vehicle is traveling, a non transit point recommended route from the current vehicle location to the destination without requiring the user selected transit point to be located along the non transit point recommended route;

determining which one of the first recommended route and the non transit point recommended route will result in an earlier arrival at the destination;

determining whether the user selected transit point is the disposable type, through which the non transit point recommended route is not required to pass, based on a setting condition that is used as part of the user setting instruction to set the user selected transit point; and presenting the non transit point recommended route to the user when the user selected transit point is the disposable type and when the non transit point recommended route will result in an arrival at the destination earlier than the first recommended route.

* * * * *